(12) United States Patent
Tomioka (10) Patent No.: US 11,348,495 B2
(45) Date of Patent: May 31, 2022

(54) IMAGE DISPLAY SYSTEM FOR VEHICLE

(71) Applicant: DENSO CORPORATION, Kariya (JP)

(72) Inventor: Shun Tomioka, Kariya (JP)

(73) Assignee: DENSO CORPORATION, Kariya (JP)

( * ) Notice: Subject to any disclaimer, the term of this patent is extended or adjusted under 35 U.S.C. 154(b) by 606 days.

(21) Appl. No.: 16/262,983

(22) Filed: Jan. 31, 2019

(65) Prior Publication Data

US 2019/0164461 A1 May 30, 2019

Related U.S. Application Data

(63) Continuation of application No. PCT/JP2017/019720, filed on May 26, 2017.

(30) Foreign Application Priority Data

Aug. 2, 2016 (JP) .............................. JP2016-151976

(51) Int. Cl.
| | |
|---|---|
| *G09G 3/00* | (2006.01) |
| *B60K 35/00* | (2006.01) |
| *G02B 27/01* | (2006.01) |
| *B60R 11/02* | (2006.01) |
| *G09G 5/00* | (2006.01) |
| *B60K 37/02* | (2006.01) |

(52) U.S. Cl.
CPC ............. *G09G 3/006* (2013.01); *B60K 35/00* (2013.01); *B60K 37/02* (2013.01); *B60R 11/02* (2013.01); *G02B 27/01* (2013.01); *G09G 5/00* (2013.01); *B60K 2370/186* (2019.05)

(58) Field of Classification Search
CPC combination set(s) only.
See application file for complete search history.

(56) References Cited

U.S. PATENT DOCUMENTS

2012/0038685 A1* 2/2012 Tanaka .................. G06F 3/1431
345/690
2017/0094268 A1* 3/2017 Gulati .................... B60K 35/00

FOREIGN PATENT DOCUMENTS

| JP | 2004249836 A | 9/2004 |
| JP | 2006268514 A | 10/2006 |
| JP | 2013216182 A | 10/2013 |

* cited by examiner

*Primary Examiner* — Nabil H Syed
*Assistant Examiner* — Cal J Eustaquio
(74) *Attorney, Agent, or Firm* — Harness, Dickey & Pierce, P.L.C.

(57) ABSTRACT

An image display system for a vehicle includes a plurality of image display devices. Each of the image display devices diagnoses a failure of a self-circuit and outputs a diagnosis result. When one of the image display devices to display security requirement information is determined to be in failure based on the diagnosis result, the security requirement information is output to another of the image display devices determined to be normal.

11 Claims, 7 Drawing Sheets

IMAGE DISPLAY SYSTEM FOR VEHICLE

CROSS REFERENCE TO RELATED APPLICATIONS

The present application is a continuation application of International Patent Application No. PCT/JP2017/019720 filed on May 26, 2017, which designated the United States and claims the benefit of priority from Japanese Patent Application No. 2016-151976 filed on Aug. 2, 2016. The entire disclosures of all of the above applications are incorporated herein by reference.

TECHNICAL FIELD

The present disclosure relates to an image display system for a vehicle.

BACKGROUND

A system has been proposed which includes a failure detection circuit mounted inside a display, detects a failure inside the display, and notifies a server of the failure.

SUMMARY

The present disclosure provides an image display system for a vehicle including a plurality of image display devices. Each of the image display devices diagnoses a failure of a self-circuit, and outputs a diagnosis result. When one of the image display devices to display security requirement information is determined to be in failure based on the diagnosis result, the security requirement information is output to another of the image display devices determined to be normal.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

A system according to a related art includes a failure detection circuit mounted inside a display, detects a failure inside the display, and notifies a server. The server is not prepared in a vehicle. In a case where the system is applied to a vehicle and a display device displaying the minimum security requirement information necessary for driving such as a meter fails, even if a failure of the display device can be detected, if the security requirement information cannot be displayed in the vehicle, an operation of the vehicle cannot be continued.

A system according to another related art connects a plurality of control devices and a plurality of display devices to each other through a network bus, detects a failure through the network bus, and performs an alternative display. However, the system considers only a failure of any one of the control devices or the display devices and does not consider displaying the security requirement information.

An image display system for a vehicle according to an aspect of the present disclosure includes an image output device capable of outputting image signals from a plurality of image output units at a same time, a plurality of image display devices each receiving the image signal output from the image output device through an image input unit and displaying the image signal as an image on an image display unit, and a vehicle signal generation unit generating a vehicle signal indicative of a state of a vehicle. Each of the image display devices includes a self-circuit failure diagnosis unit diagnosing a failure of a self-internal circuit, a failure diagnosis result determination unit determining whether the self-internal circuit is in failure based on a diagnosis result by the self-circuit failure diagnosis unit, and a diagnosis result notification unit notifying the image output device of a diagnosis result by the failure diagnosis result determination unit. The image output device includes a first vehicle signal input unit receiving the vehicle signal generated by the vehicle signal generation unit, a first image content generation unit generating security requirement information based on the vehicle signal, and an image display destination determination unit outputting the security requirement information to one of the plurality of image output units corresponding to one of the plurality of image display devices determined to be normal in a case where another of the plurality of image display devices is determined to be in failure based on the diagnosis result notified from the another of the plurality of image display devices and the security requirement information is to be displayed on the another of the plurality of image display devices.

An image display system for a vehicle according to another aspect of the present disclosure includes a plurality of image display devices and a controller. Each of the image display devices includes a self-circuit and an image display unit and is configured to receive an image signal and display the image signal as an image on the image display unit, and diagnose a failure of the self-circuit and output a diagnosis result. The controller is configured to be connected with the image display devices and a vehicle signal generation unit through an in-vehicle network, receive a vehicle signal indicative of a state of a vehicle from the vehicle signal generation unit, generate security requirement information based on the vehicle signal, receive the diagnosis result from each of the image display devices, and output the security requirement information and the image signal to one of the image display devices determined to be normal based on the diagnosis result.

In the above-described image display systems, even when the security requirement information is to be displayed on the image display device determined to be in failure, since the security requirement information can be displayed on the image display device determined to be normal, the security requirement information can be provided to a driver.

Figure 2:
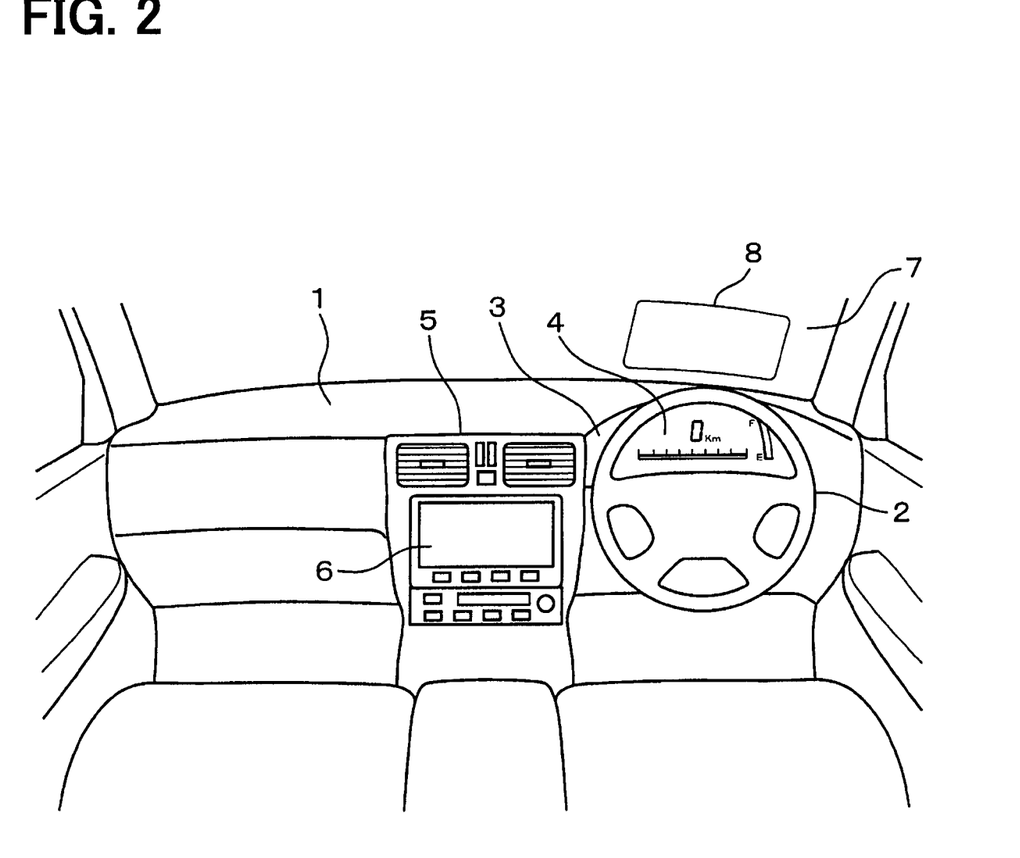
FIG. 2 is a diagram showing a periphery of an instrument panel.

Hereinafter, an embodiment will be described with reference to the drawings. As shown in FIG. 2, a dashboard 1 is provided in front of a vehicle interior, and an instrument panel 3 is provided in a portion of the dashboard 1 at a back side of a steering wheel 2. A first image display device 4 is provided on the instrument panel 3 so as to be visible through an opening portion of the steering wheel 2. The first image display device 4 has functions of displaying a speed meter, a tachometer, an odometer, a water temperature gauge, a fuel gauge, a clock, and various warning lamps.

A second image display device 6 is provided in a center console 5. When a navigation function is selected, the second image display device 6 displays various switches and maps for operating a navigation apparatus, and when an audio function is selected, the second image display device 6 displays various switches for operating an audio device.

A third image display device 8 is provided in a portion of a front windshield 7 which is in front of a driver's seat. The third image display device 8 is a self-luminous transparent EL display and functions as a head-up display.

Although each of the first image display device 4 and the second image display device 6 is configured by a liquid crystal display, each of those image display devices may be configured by an EL display or an LED display. In addition, the number of image display devices is not limited to three, and any number of image display devices may be provided as long as multiple image display devices are provided.

Figure 1:
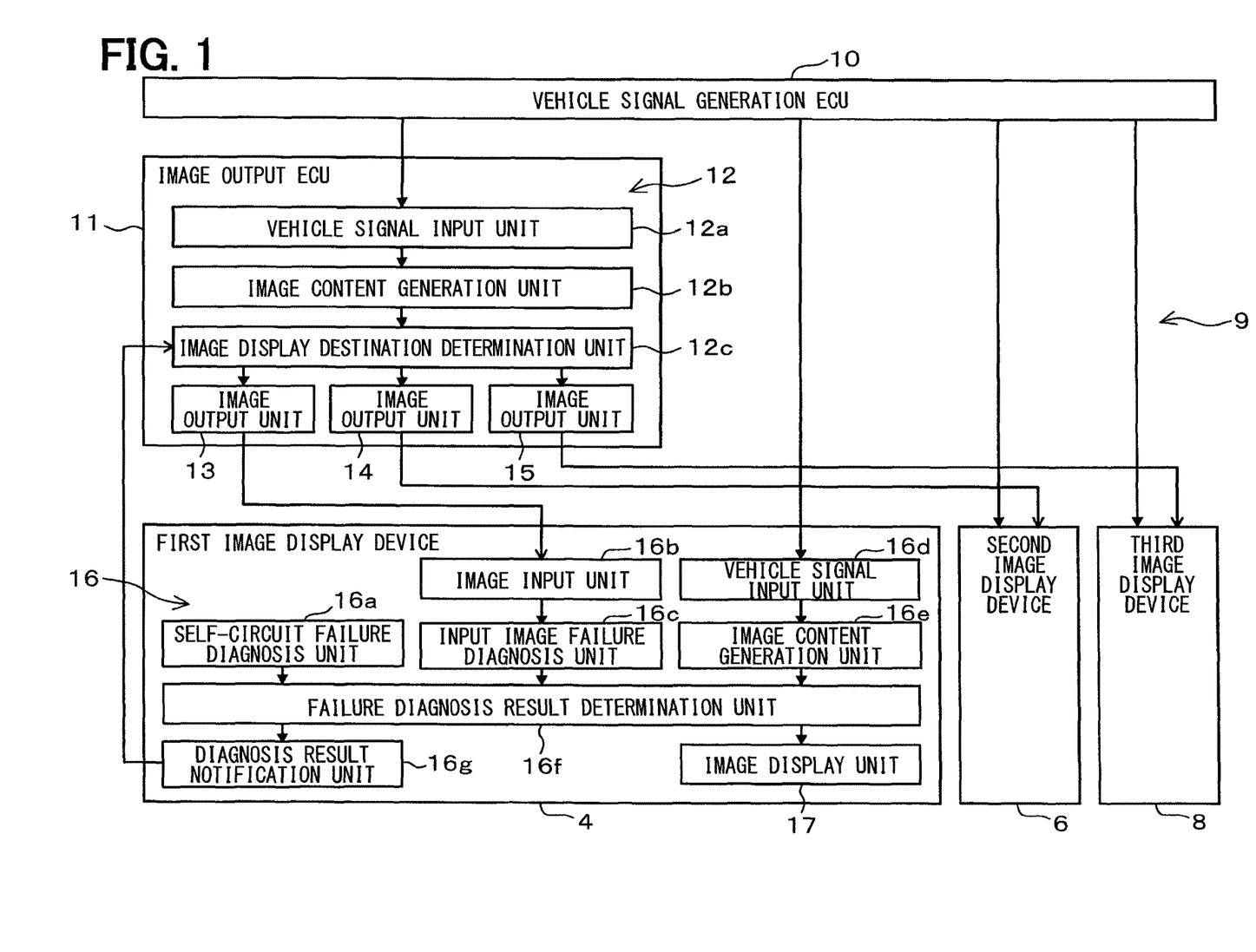
FIG. 1 is a functional block diagram showing a configuration of an image display system according to an embodiment.

As shown in FIG. 1, a vehicle image display system 9 includes a vehicle signal generation ECU 10 (corresponding to a vehicle signal generation unit), an image output ECU (electronic control unit) 11 (corresponding to an image output device), and the image display devices 4, 6, and 8. The vehicle image display system 9 controls the display of the three image display devices 4, 6, and 8 by the image output ECU 11.

The image output ECU 11 is connected to the vehicle signal generation ECU 10 through an in-vehicle network. Protocols such as CAN (controller area network), LIN (local interconnect network), FlexRay (registered trademark), and Ethernet (registered trademark) are used for the in-vehicle network protocol. FIG. 1 shows the ECUs related to the present disclosure, and in fact, a large number of ECUs are connected to the in-vehicle network.

Figure 3:
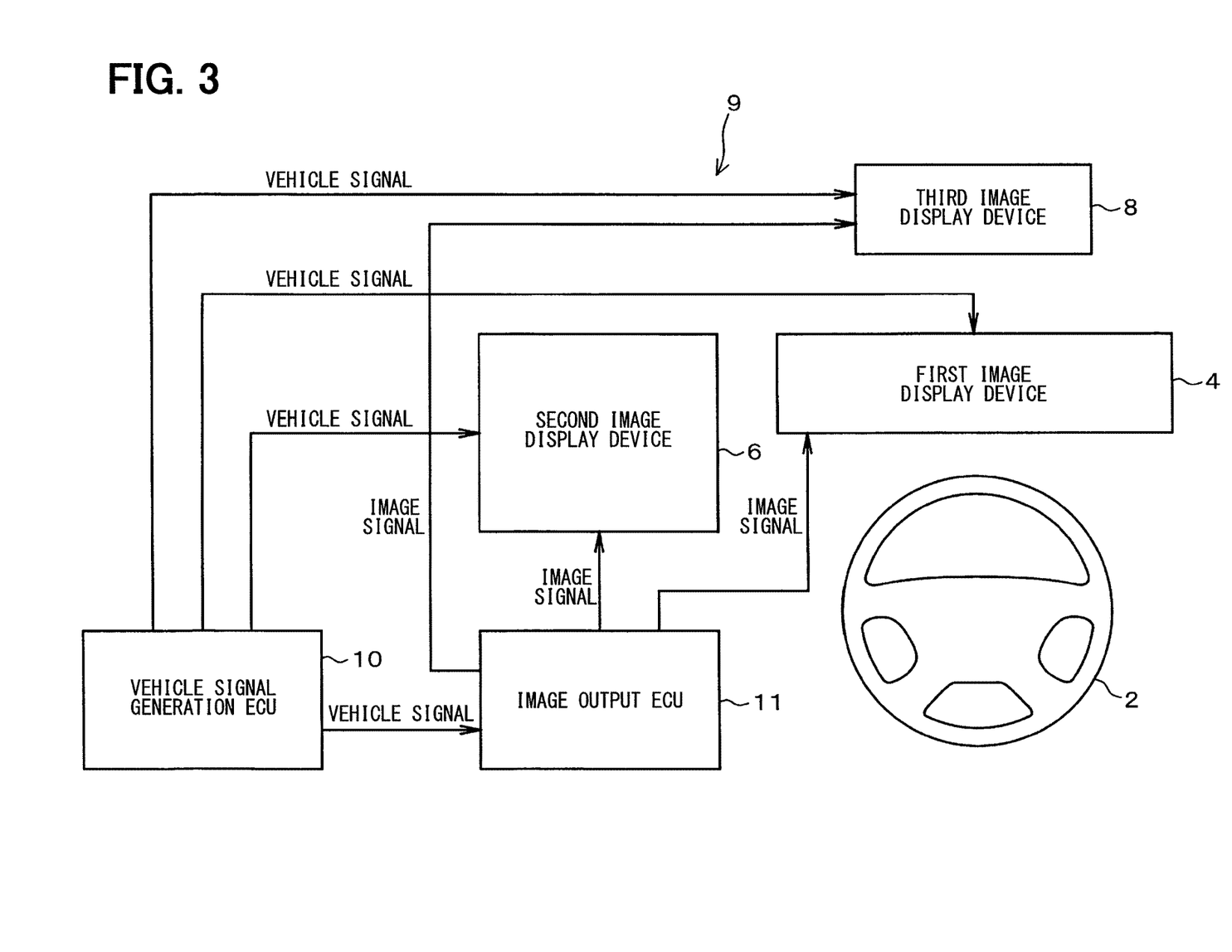
FIG. 3 is a block diagram showing signal transmission.

The vehicle signal generation ECU 10 generates vehicle signals indicative of a vehicle speed, and an engine speed based on signals received from various vehicle-mounted sensors and other ECUs, and transmits the generated vehicles signals to the image output ECU 11 and the respective image display devices 4, 6, and 8, as shown in FIG. 3.

A control unit 12 of the image output ECU 11 is configured by a microcomputer having a CPU (central processing unit), a ROM (read only memory), a RAM (random access memory), and an I/O (input/output). The control unit 12 executes a computer program stored in a non-transitory tangible storage medium to execute processing corresponding to the computer program, to thereby control the overall operation of the respective image display devices 4, 6, and 8.

The control unit 12 includes a vehicle signal input unit 12a (corresponding to a first vehicle signal input unit), an image content generation unit 12b (corresponding to a first image content generation unit), an image display destination determination unit 12c, first to third image output units 13, 14, and 15. The vehicle signal input unit 12a, the image content generation unit 12b, and the image display destination determination unit 12c are realized by a program to be executed by the control unit 12, and are realized by software.

The vehicle signal input unit 12a receives the vehicle signal from the vehicle signal generation ECU 10. The image content generation unit 12b generates the image content for displaying minimum security requirement information necessary for driving based on the vehicle signal input by the vehicle signal input unit 12a. The security requirement information includes, for example, a vehicle speed, an engine speed, a traveling distance, a coolant water temperature of an engine, an oil temperature of the engine, a shift range of an automatic transmission, a fuel level, and a battery level in a case of an electric vehicle.

When determining that one of the image display devices 4, 6, and 8 is in failure based on a diagnosis result input from each of the image display devices 4, 6, and 8 as will be described later, the image display destination determination unit 12c outputs the image content generated by the image content generation unit 12b to the image output unit 13, 14, or 15 corresponding to a predetermined image display device 4, 6, or 8.

As shown in FIG. 3, the image output units 13, 14, and 15 convert the input information into image signals and output the converted image signals to the respective image display devices 4, 6, and 8. A control unit 16 of each of the image display devices 4, 6, and 8 is configured by a microcomputer having a CPU, a ROM, a RAM, and an I/O. The control unit 16 executes a computer program stored in a non-transitory tangible storage medium to execute processing corresponding to the computer program, to thereby control the overall operation of the image display devices 4, 6, and 8.

The control unit 16 has a function of detecting a failure of the self-internal circuit (hereinafter referred to as self-circuit) and a failure of the image output ECU 11. As a configuration for the function, the control unit 16 includes a self-circuit failure diagnosis unit 16a, an image input unit 16b, an input image failure diagnosis unit 16c, a vehicle signal input unit 16d (corresponding to a second vehicle signal input unit), an image content generation unit 16e (corresponding to a second image content generation unit), a failure diagnosis result determination unit 16f, a diagnosis result notification unit 16g, and an image display unit 17. Each of the self-circuit failure diagnosis unit 16a, the image input unit 16b, the input image failure diagnosis unit 16c, the vehicle signal input unit 16d, the image content generation unit 16e, the failure diagnosis result determination unit 16f, and the diagnosis result notification unit 16g is configured by a program to be executed by the control unit and is realized by software.

The self-circuit failure diagnosis unit 16a executes a failure diagnosis of the self-circuit. As an example of a self-circuit diagnosis method, for example, the self-circuit failure diagnosis unit 16a inputs a predetermined diagnosis signal to the self-circuit, and can determine whether the self-circuit is in failure according to whether a proper image signal corresponding to the diagnosis signal is correctly output from the self-circuit.

The image input unit 16b receives images from the image output units 13, 14, and 15 of the image output ECU 11. The input image failure diagnosis unit 16c compares a test image input by the image input unit 16b with a test image stored in advance, and determines whether the image output ECU 11 is in failure based on whether there is a difference in the compared data. In other words, the input image failure diagnosis unit 16c determines that the image output ECU 11 is normal when the both test images match each other, and determines that the image output ECU 11 is abnormal when the both test images do not match each other.

The vehicle signal input unit 16d receives the vehicle signal from the vehicle signal generation ECU 10 through the in-vehicle network. The image content generation unit 16e generates an image content for displaying the security requirement information indicated by the vehicle signal based on the vehicle signal input by the vehicle signal input unit 16d.

The failure diagnosis result determination unit 16f determines whether the self-circuit is in failure based on the diagnosis result of the self-circuit failure diagnosis unit 16a, and transmits the diagnosis result to the diagnosis result notification unit 16g.

The diagnosis result notification unit 16g transmits the diagnostic result to the image display destination determination unit 12c of the image output ECU 11. The failure diagnosis result determination unit 16f determines whether the image output ECU 11 is in failure based on the diagnosis result of the input image failure diagnosis unit 16c. When determining that the image output ECU 11 is in failure, the failure diagnosis result determination unit 16f displays the image content from the image content generation unit 16e on the image display unit 17.

When any one of the image display devices 4, 6, and 8 or the image output ECU 11 fails, information to be provided to a driver cannot be displayed. In particular, since the first image display device 4 displays the security requirement information necessary for driving, when the first image display device 4 or the image output ECU 11 fails, the security requirement information cannot be confirmed, which may cause troubles in driving.

Figure 6:
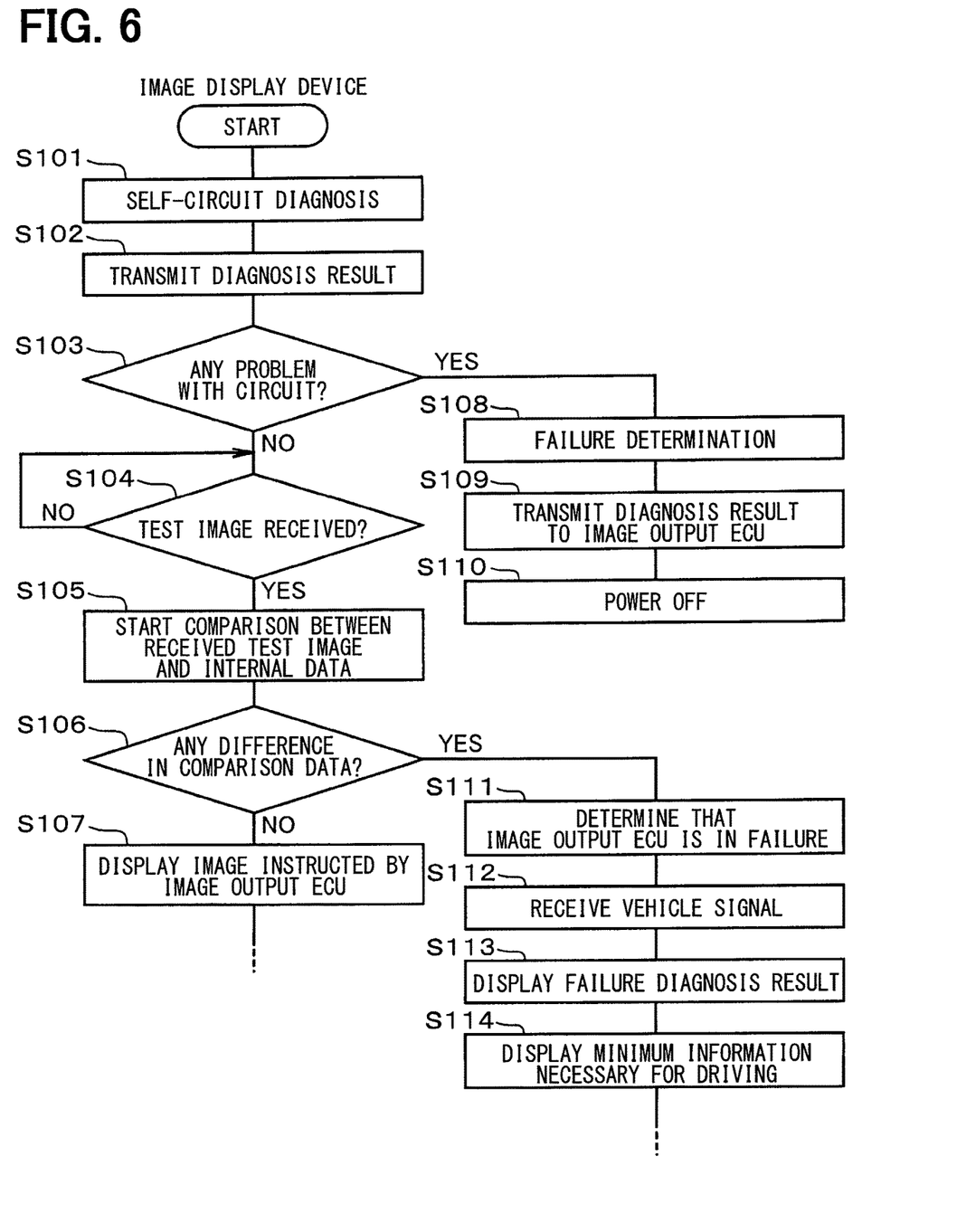
FIG. 6 is a flowchart showing an operation of an image display device.

In view of the above circumstances, a case where any one of the image display devices 4, 6, and 8 or the image output ECU 11 fails is dealt with as follows. Upon activation, as shown in FIG. 6, each of the image display devices 4, 6, and 8 first diagnoses the self-circuit for failure detection (S101) and transmits the diagnosis result to the image output ECU 11 (S102). Since each of the image display devices 4, 6, and 8 is usually normal, a normal diagnosis result indicative of normality is transmitted to the image output ECU 11.

Figure 7:
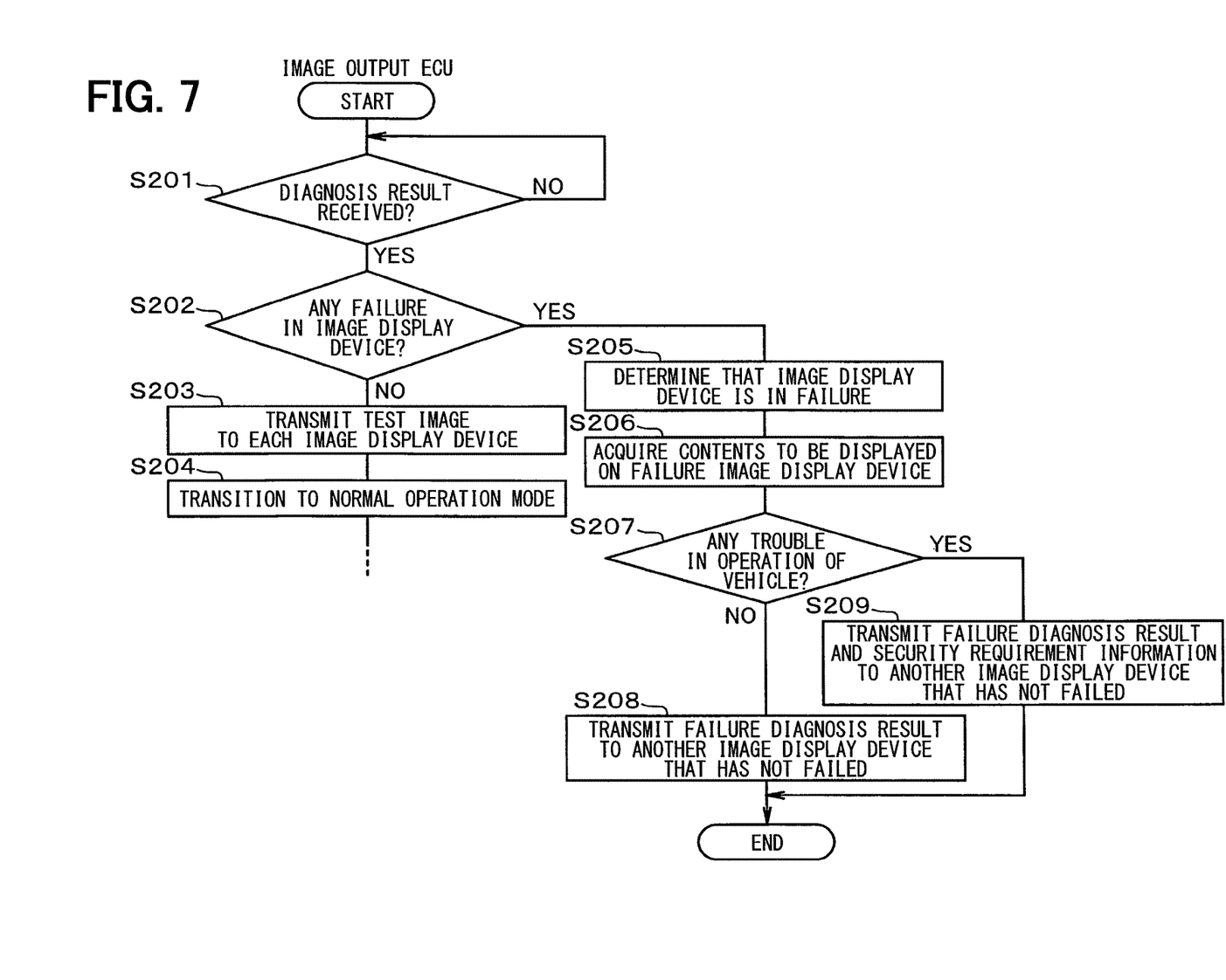
FIG. 7 is a flowchart showing an operation of the image output ECU.

As shown in FIG. 7, upon activation, the image output ECU 11 enters a standby state for receiving the diagnosis results from the image display devices 4, 6, and 8 (NO at S201). Upon receiving the diagnosis results from all of the image display devices 4, 6, and 8 (YES at S201), the image output ECU 11 determines whether the respective image display devices 4, 6, and 8 are abnormal based on the diagnosis results. When receiving the normal diagnosis results indicative of normality from the image display devices 4, 6, and 8 (NO at S202), the image output ECU 11 transmits the test image to the first image display device 4 with a fact that all of the image display devices 4, 6, and 8 are normal (S203), and then transitions to a normal operation mode to transmit an opening image (S204).

The reason that the test image is transmitted to the first image display device 4 is because it is determined whether the image output ECU 11 is abnormal by the first image display device 4 determined to be normal. Alternatively, the test image may be transmitted to the second image display device 6 or the third image display device 8 determined to be normal. In other words, it may be determined whether the image output ECU 11 is abnormal by any one of the image display devices 4, 6, and 8 that are determined to be normal. If it is determined that the first image display device 4 is in failure, the test image may be transmitted to the second image display device 6.

Hereinafter, the operation of the first image display device 4 will be described. After transmitting the normal diagnosis result indicative of normality as described above, since there is no problem in the self-circuit of the first image display device 4 (NO at S103), the first image display device 4 enters a waiting state for receiving the test image from the image output ECU 11 (NO at S104). When receiving the test image (YES at S104), the first image display device 4 compares the received test image with the test image stored in advance (S105), and determines whether there is a difference between the compared data (S106). If there is no difference between the compared data (NO at S106), the first image display device 4 determines that the image output ECU 11 is normal and displays the image from the image output ECU 11 (S107). Likewise, the second image display device 6 and the third image display device 8 also display the image instructed from the image output ECU 11.

As described above, when both of the image display devices 4, 6, 8 and the image output ECU 11 are normal, the opening image from the image output ECU 11 is displayed on each of the image display devices 4, 6, and 8 in a manner similar to the conventional art.

When any one of the image display devices 4, 6, and 8, for example, the first image display device 4 fails, the first image display device 4 determines that the self-circuit is in failure (S101) and transmits the failure diagnosis result indicative of the failure to the image output ECU 11 (S102). Then, since the self-circuit is in failure (YES at S103), the first image display device 4 determines to be failure (S108), transmits the diagnosis result to the image output ECU 11 (S109), and then turns off a power supply (S110).

When receiving the failure diagnosis result from the first image display device 4 (YES at S202), the image output ECU 11 determines that the first image display device 4 is in failure (S205), acquires the content to be displayed on the first image display device 4 (S206), and determines whether the content corresponds to the security requirement information having trouble in the operation of the vehicle (S207). In that case, since the content to be displayed on the failed first image display device 4 is the security requirement information (YES at S207), the image output ECU 11 transmits the security requirement information to the image display unit 17 in addition to the failure diagnosis result (S209) and urges the driver to bring the vehicle to a dealer.

Figure 4:
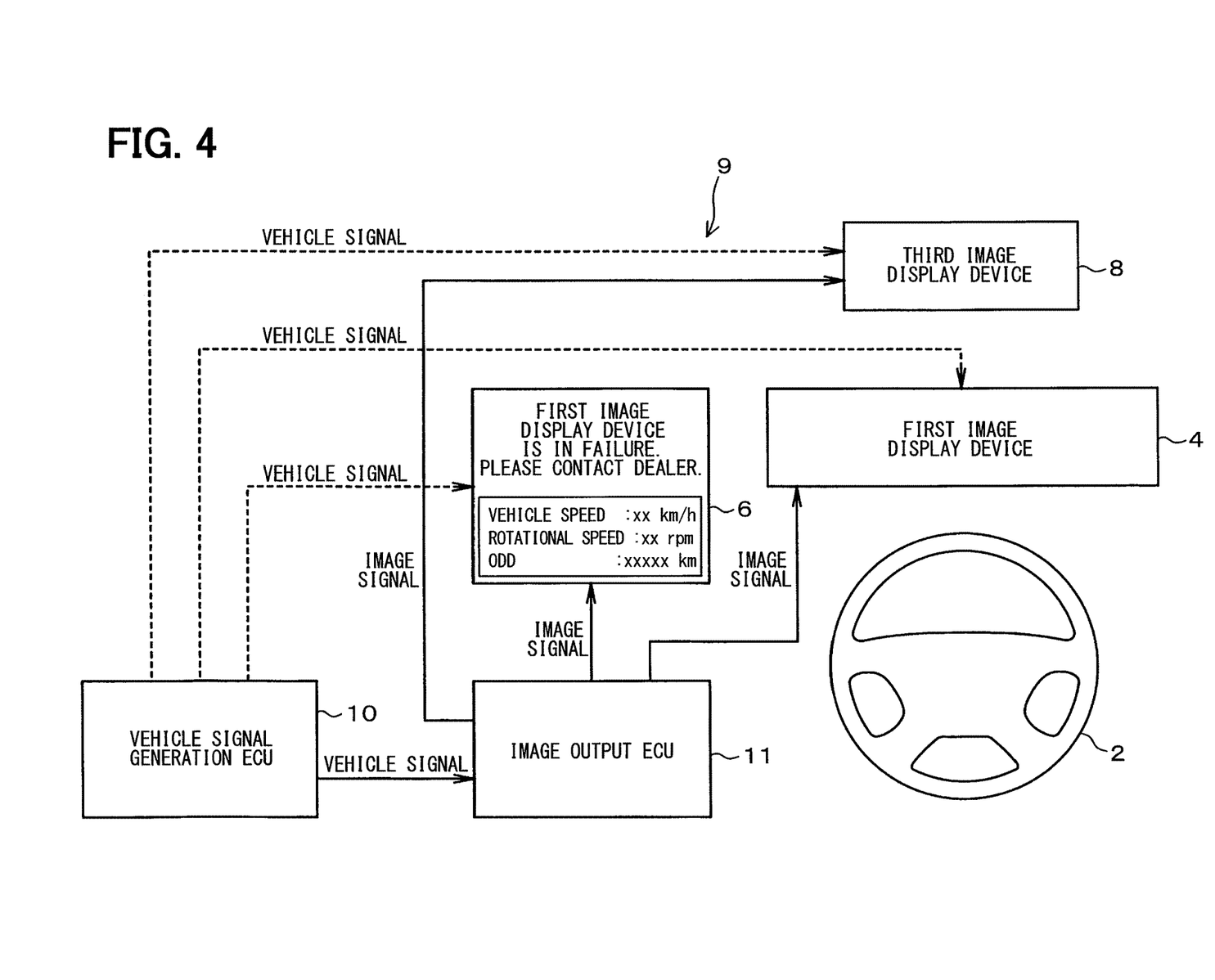
FIG. 4 is a block diagram showing signal transmission in a state where a first image display device is in failure.

An example shown in FIG. 4 illustrates an example in which the first image display device 4 has failed, and the second image display device 6 displays that the first image display device 4 is in failure, and displays a vehicle speed, a rotational speed, and a traveling distance as the security requirement information. As a result, even if the first image display device 4 fails, since the security requirement information is displayed on the second image display device 6, the driver can properly drive the vehicle while checking the security requirement information displayed on the second image display device 6. In addition, since the driver recognizes that the first image display device 4 is in failure, the driver requests the dealer to repair the first image display device 4.

When the image output ECU 11 determines that the content does not correspond to the security requirement information (NO at S207), the image output ECU 11 selects one of the normal second image display device 6 and the normal third image display device 8 with a higher display priority and transmits the failure diagnosis result (S208). The display priority is in an order of the first image display device 4, the second image display device 6, and the third image display device 8, which is the decreasing order of visibility. In the present case, since the first image display device 4 is in failure, the second image display device 6 is to be displayed. However, the priority of the third image display device 8 having the function of a head-up display may be set to be higher than the priority of the second image display device 6.

Figure 5:
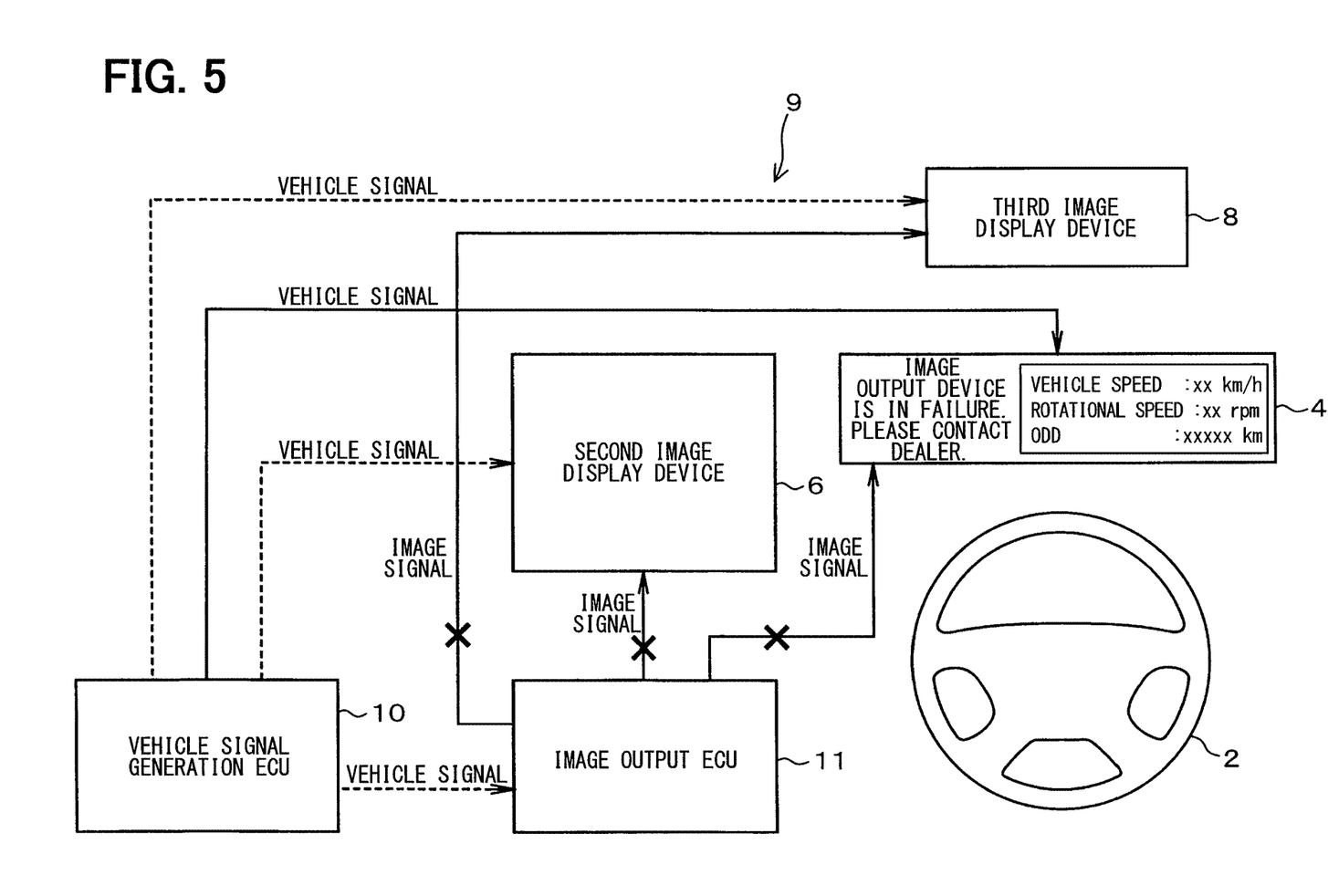
FIG. 5 is a block diagram showing signal transmission in a state where an image output ECU is in failure.

When the image output ECU 11 is in failure, as shown in FIG. 5, the test image is not output from the image output ECU 11. In such a case, since there is a difference in compared data between the test image received from the image output ECU 11 and the test image stored in advance (YES at S106), the first image display device 4 determines that the image output ECU 11 is in failure (S111). Then, the first image display device 4 receives the vehicle signal from the vehicle signal generation ECU 10 (S112), displays the failure diagnosis result on the image display unit 17 (S113), and generates and displays the minimum security requirement information necessary for driving based on the vehicle signal (S114).

An example shown in FIG. 5 illustrates a case where the first image display device 4 determines that the image output ECU 11 is in failure. The first image display device 4 displays the minimum security requirement information necessary for driving based on the vehicle signal received from the vehicle signal generation ECU 10, displays a message that the image output ECU 11 is in failure, and urges the driver to bring the vehicle to a nearest repair shop. As a result, even when the image output ECU 11 is in failure, the driver can appropriately drive the vehicle by checking the security requirement information displayed on the first image display device 4. In addition, since the driver recognizes that the image output ECU 11 is in failure, the driver requests the dealer for repair.

The embodiment described above can obtain the following advantages. Each of the image display devices 4, 6, and 8 diagnoses the self-circuit and notifies the image output ECU 11 of the failure diagnosis result when determining that the self-circuit is in failure based on the diagnosis result. In a case where the image output ECU 11 has been notified of the failure diagnosis result from one of the image display devices 4, 6, or 8 and the minimum security requirement information necessary for driving is to be displayed on the one of the image display device 4, 6, or 8, the image output ECU 11 alternatively displays the security requirement information on the predetermined image display device 4, 6, or 8 determined to be normal. As a result, the driver can confirm the security requirement information displayed on any one of the normal image display devices 4, 6, and 8, thereby being capable of appropriately performing the driving.

In the case of alternatively displaying the security requirement information on the normal image display devices 4, 6, or 8, since the image output ECU 11 displays an image indicating that the image display device 4, 6, or 8 determined to be abnormal is in failure, the driver recognizes that the image display device 4, 6, or 8 is in failure and requests for repair.

In the case where each of the image display devices 4, 6, and 8 compares the test image input from the image output ECU 11 with the test image stored in advance, and determines that the image output ECU 11 is in failure based on the comparison result, since each of the image display devices 4, 6, and 8 displays a message that the image output ECU 11 is in failure, the driver recognizes that the image output ECU 11 is in failure and requests for repair.

When determining that the image output ECU 11 is abnormal, since each of the image display devices 4, 6, and 8 generates the security requirement information based on the vehicle signal input from the vehicle signal generation ECU 10 and displays the generated security requirement information on the image display unit 17, even if the image output ECU 11 fails, each of the image display devices 4, 6, and 8 can provide the security requirement information to the driver.

(Other Embodiments)

The image output ECU 11 may output an opening screen as the test image. In that case, the image display device 4, 6, or 8 compares the opening screen input from the image output ECU 11 with the opening screen stored in advance. With the employment of the above configuration, the operation of transmitting the test image from the image output ECU 11 can be omitted.

The substitute display performed by the image display device 4, 6, or 8 when the image output ECU 11 fails may also be an icon display by an LED (corresponding to a notification unit) instead of a display on the image display unit 17. The substitute display performed by the image display device 4, 6, or 8 when the image output ECU 11 fails may also be a simplified numeral display (corresponding to a notification unit) by a 7-segment LED instead of a display.

As a method of detecting a failure of the image output ECU 11, a failure diagnosis method based on a watchdog pulse or specific command communication may also be used instead of a confirmation of a signal indicating the image. As a method of detecting the failure of the image display devices 4, 6, and 8, a watchdog pulse or a failure diagnosis method by specific command communication may also be used instead of a confirmation of the self-failure diagnosis result of the image display devices 4, 6, and 8.

The method of detecting the failure of the image display devices 4, 6, and 8 may also be an information input of the presence or absence of a failure by the driver instead of the confirmation of the self-failure diagnosis result of the image display devices 4, 6, and 8. The method of detecting the failure of the image display devices 4, 6, and 8 may also be a determination of the presence or absence of the image output by an on-board camera instead of the confirmation of the self-failure diagnosis result of the image display devices 4, 6, and 8.

The present disclosure has been described based on the embodiments, but it is understood that the present disclosure is not limited to the embodiments and constructions. The present disclosure includes various modification examples and modifications within the equivalent range. Further, various combinations and forms, and furthermore, other combinations and forms including only one element, more elements, or less elements are included within the range and the scope of the present disclosure.

What is claimed is:

1. An image display system for a vehicle comprising:
   an image output device capable of outputting image signals from a plurality of image output units at a same time;
   a plurality of image display devices each receiving the image signal output from the image output device through an image input unit and displaying the image signal as an image on an image display unit; and
   a vehicle signal generation unit generating a vehicle signal indicative of a state of a vehicle, wherein
   each of the plurality of image display devices includes:
      a self-circuit failure diagnosis unit diagnosing a failure of a self-internal circuit;
      a failure diagnosis result determination unit determining whether the self-internal circuit is in failure based on a diagnosis result by the self-circuit failure diagnosis unit; and a diagnosis result notification unit notifying the image output device of a diagnosis result by the failure diagnosis result determination unit, the image output device includes:
a first vehicle signal input unit receiving the vehicle signal generated by the vehicle signal generation unit;
a first image content generation unit generating security requirement information based on the vehicle signal; and
an image display destination determination unit outputting the security requirement information to one of the plurality of image output units corresponding to one of the plurality of image display devices determined to be normal in a case where another of the plurality of image display devices is determined to be in failure based on the diagnosis result notified from the another of the plurality of image display devices and the security requirement information is to be displayed on the another of the plurality of image display devices, each of the plurality of image display devices further includes:
a second vehicle signal input unit receiving the vehicle signal generated by the vehicle signal generation unit; and
a second image content generation unit generating the security requirement information based on the vehicle signal, the failure diagnosis result determination unit displays the security requirement information generated by the second image content generation unit on the image display unit when the image output device is determined to be in failure, and the security requirement information is necessary to be displayed in order to continue an operation of the vehicle.

2. The image display system according to claim 1, wherein
the image display destination determination unit outputs an image indicating that the another of the plurality of image display devices is in failure to the one of the plurality of image output units corresponding to the one of the plurality of image display devices determined to be normal when the another of the plurality of image display devices is determined to be in failure.

3. The image display system according to claim 1, wherein
the image display destination determination unit outputs a test image to the one of the plurality of image output units corresponding to the one of the plurality of image display devices when the one of the plurality of image display devices is determined to be normal, the one of the plurality of image display devices includes an input image failure diagnosis unit that compares the test image input from the one of the plurality of image input units with a test image stored in advance, and determines that the image output device is in failure when compared data do not match each other, and the failure diagnosis result determination unit displays an image indicating that the image output device is in failure on the image display unit when the image output device is determined to be in failure based on the diagnosis result of the input image failure diagnosis unit.

4. The image display system according to claim 3, wherein
an opening screen is used as the test image.

5. An image display system for a vehicle comprising:
a plurality of image display devices each including a self-circuit and an image display unit and configured to:
receive an image signal and display the image signal as an image on the image display unit; and
diagnose a failure of the self-circuit and output a diagnosis result; and
a controller configured to:
be connected with the plurality of image display devices and a vehicle signal generation unit through an in-vehicle network;
receive a vehicle signal indicative of a state of a vehicle from the vehicle signal generation unit;
generate security requirement information based on the vehicle signal;
receive the diagnosis result from each of the plurality of image display devices; and
output the security requirement information and the image signal to one of the plurality of image display devices determined to be normal based on the diagnosis result, wherein each of the plurality of image display devices is configured to:
be connected with the vehicle signal generation unit through the in-vehicle network:
receive the vehicle signal from the vehicle signal generation unit and generate the security requirement information based on the vehicle signal; and
display the security requirement information on the image display unit when the controller is determined to be in failure, and the security requirement information is necessary to be displayed in order to continue an operation of the vehicle.

6. The image display system according to claim 5, wherein
the controller is configured to output the image signal indicating that another of the plurality of image display devices is in failure to the one of the plurality of image display devices determined to be normal when the another of the plurality of image display devices is determined to be in failure based on the diagnosis result.

7. The image display system according to claim 5, wherein
the controller is configured to output a test image to the one of the plurality of image display devices determined to be normal, the one of the plurality of image display devices is configured to:
compare the test image input from the controller with a test image stored in advance;
determine that the controller is in failure when compared data do not match each other; and
display an image indicating that the controller is in failure on the image display unit when the controller is determined to be in failure.

8. The image display system according to claim 7, wherein
the controller is configured to output an opening screen as the test image.

9. The image display system according to claim 5, wherein
the controller includes a non-transitory tangible storage medium and a computer program stored in the non-transitory tangible storage medium, and the controller executes processing corresponding to the computer program.

10. The image display system according to claim 1, wherein
the second vehicle signal input unit is directly connected with the vehicle signal generation unit through an in-vehicle network.

11. The image display system according to claim 5, wherein
each of the plurality of image display devices is directly connected with the vehicle signal generation unit through the in-vehicle network.

* * * * *